United States Patent [19]
Raymond et al.

[11] 3,849,246
[45] Nov. 19, 1974

[54] RECOVERY OF PAPER FIBER FROM WASTE MATERIAL CONTAMINATED WITH GREASE, WAX AND/OR SIMILAR MATERIAL

[75] Inventors: Delmar R. Raymond, Suffern; Jack M. Kleinfeld, Bronx, both of N.Y.

[73] Assignee: Black Clawson Fibreclaim, Inc., New York, N.Y.

[22] Filed: June 13, 1974

[21] Appl. No.: 478,792

Related U.S. Application Data

[63] Continuation-in-part of Ser. No. 294,324, Oct. 2, 1972, abandoned.

[52] U.S. Cl................... 162/4, 162/189, 210/72, 210/84, 241/17
[51] Int. Cl.......................................... D21b 1/08
[58] Field of Search................. 162/4, 5, 6, 7, 8, 55, 162/57, 58, 147, 172, 173, 189; 210/84, 69, 71, 72; 209/211; 241/15, 21, 28, 17

[56] References Cited
UNITED STATES PATENTS

| | | | |
|---|---|---|---|
| 1,764,390 | 6/1930 | Cleary | 210/71 |
| 3,486,619 | 12/1969 | Grundelius | 162/4 X |
| 3,507,742 | 4/1970 | Rice | 162/5 |
| 3,549,092 | 12/1970 | Baxter, Jr. | 241/15 |
| 3,557,956 | 1/1971 | Braun | 210/84 |
| 3,615,014 | 10/1971 | Hruby | 209/211 |
| 3,736,223 | 5/1973 | Marsh | 162/4 |

FOREIGN PATENTS OR APPLICATIONS

| | | | |
|---|---|---|---|
| 1,206,550 | 9/1970 | Great Britain | 162/4 |

*Primary Examiner*—Robert L. Lindsay, Jr.
*Assistant Examiner*—Richard V. Fisher
*Attorney, Agent, or Firm*—Biebel, French & Bugg

[57] ABSTRACT

In a method of recovering reusable papermaking fibers from waste material containing substantial quantities of grease, wax and/or similar materials, such particularly as municipal waste including garbage, a slurry of cellulose fibers contaminated by grease and/or wax is heated to an elevated temperature, e.g. 180°F, and subjected to a centrifugal flotation treatment in a cylindrical-conical or conical vessel having a tangential inlet port and outlet ports at its apex and base, the supply flow and pressure to the vessel being maintained sufficiently high and the discharge flows through the outlet ports being controlled to effect discharge of substantial volumetric flows through both outlet ports under centrifugal force conditions comparable to those used in conventional centrifugal cleaning operations in a vortex separator of comparable size. The discharge flow through the apex port contains a large majority of the fibers of good paper making quality, while the discharge flow through the base (top) outlet contains the majority of the reject material, a significant proportion of which is solvent-soluble grease, wax and/or similar material. This process of hot centrifugal flotation is also applicable to other secondary fiber stocks, e.g. de-inked stocks, containing appreciable quantities of grease, wax and/or similar material such particularly as plastic fibers and fragments similar in specific gravity to paper fibers.

9 Claims, 1 Drawing Figure

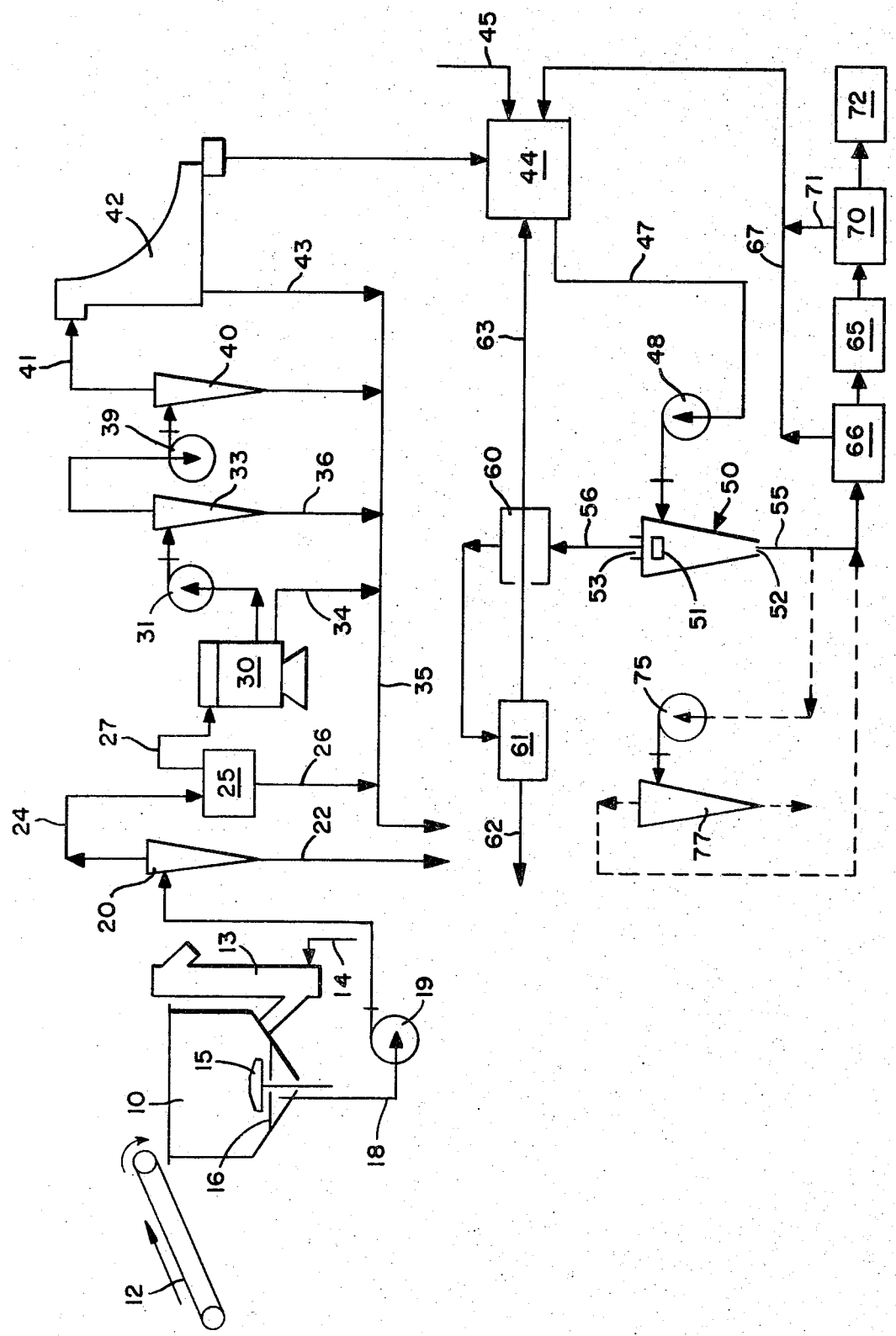

RECOVERY OF PAPER FIBER FROM WASTE MATERIAL CONTAMINATED WITH GREASE, WAX AND/OR SIMILAR MATERIAL

CROSS REFERENCE TO RELATED APPLICATIONS

This application is a continuation-in-part of our application Ser. No. 294,324 filed Oct. 2, 1972 now abandoned.

Ser. No. 94,084, Filed Dec. 1, 1970, Paul G. Marsh, now U.S. Pat. No. 3,736,223 issued May 29, 1973. Ser. No. 224,815, Filed Feb. 9, 1972, Paul G. Marsh and David E. Chupka, now abandoned and replaced by a continuation Ser. No. 415,301 filed Nov. 13, 1973.

BACKGROUND OF THE INVENTION

The first of the above-noted application describes a system and process for treating solid waste materials to recover reusable paper making fibers therefrom. Typical of the waste materials treated according to that disclosure are household, commercial and industrial wastes, all of which are included under the designation "municipal refuse" hereinafter. Municipal refuse generally contains materials of highly disparate character, including glass, metals, animal and food wastes, vegetation, dirt, plastics, a large proportion of paper and paperboard, and other fibrous and fiber-like materials such as textiles composed of both natural and synthetic fibers.

The process and system described in the above U.S. Pat. No. 3,736,223 are generally successful in separating the paper making fibrous constituent of municipal refuse from water soluble contaminants, and also in removing the inorganic solid contaminants as well as the organic solid contaminants having specific gravities substantially higher than the fibers, which is readily accomplished by gravity or centrifugal cleaning, in a liquid cyclone or like cleaner. There is one category of contaminant, however, which has proved to be most difficult to separate effectively from the fibers, and this category comprises grease, including animal, vegetable and mineral, which is inevitably present in garbage as well as industrial and commerical (office) waste. Grease is not only a contaminant, per se, of paper making fibers, but it is further undesirable because of its tendency to exist as clumps or lumps to which fibers, as well as other low specific gravity contaminants such as dirt, ink and asphalt particles, tend to become attached, and which respond like fibers to centrifugal cleaning. Another contaminant which behaves very similarly to grease comprises waxes, which are common in waste papers and similarly tend to adhere to fibers and other solid particles. All of these types of contaminants are sometimes grouped hereinafter in the category of "solvent-soluble" contaminants, and they comprise a surprisingly large proportion of the solids in municipal refuse, namely up to about 5 percent or 100 pounds per ton.

Application Ser. No. 415,301 discloses a process wherein solid waste materials, such particularly as municipal refuse, are treated to form an aqueous slurry wherein the solids consist essentially of fibrous materials and lights of the types outlined above and which are substantially free of other solid particles having specific gravities substantially higher than 1.0. Further according to that application, these light materials can be effectively eliminated by centrifugal treatment termed "centrifugal flotation" wherein this slurry is directed through a tangential inlet port into a vessel of cylindrical-conical or conical shape which is also provided in its apex and base with outlet ports as in a conventional centrifugal separator. The tangential inflow establishes a vortical flow pattern in the vessel about the axis thereof which results in separating the solids within the vessel into two major fractions. In the inner fraction, the solids will comprise predominately the lights category of contaminants, while the outer fraction will contain the large majority of the papermaking fibers.

The conical vessel in which this separation is effected differs in structure and mode of operation from conventional centrifugal cleaners, in which the outlet port from the base of the cone is commonly of approximately the same size as the inlet port, but the outlet port from the apex of the cone is so restricted that discharge therefrom is limited to a relatively minor volume (commonly less than 5 percent) of the inlet flow. Such a division of outlet flow is quite satisfactory when the purpose is to remove gritty contaminants from otherwise relatively clean paper fibers, but it would produce no useful results for the purpose of the present invention, because the majority of the paper fibers and the lights would discharge together through the base outlet port.

In accordance with application Ser. No. 415,301, the apex outlet port is of substantially greater size than in a conventional cleaner, and the infeed pressure and supply flow are maintained sufficiently high to cause discharge through both outlet ports at substantial volumetric rates and with a pressure drop equal to or substantially higher than that used for conventional operations. Under these conditions, most of the papermaking fibers will discharge through the apex port with the outer fraction into which the slurry is separated within the vessel, while the lights will discharge with the inner fraction through the port in the base of the vessel which is the accepts port in conventional centrifugal cleaning operations.

SUMMARY OF THE INVENTION

In accordance with the present invention, it has been discovered that unexpectedly superior results are obtained if the process disclosed in application Ser. No. 415,301 is practiced at elevated temperatures. More particularly, when a slurry of papermaking fibers contaminated with garbage is treated by centrigual flotation at temperatures of the order of 160°–200°F, the consistency of the accepted stock, i.e. the stock discharged through the apex port, increase substantially as compared with the corresponding conditions at ambient temperature, and the percentage of accepted fibers also increases. The percentage of reject material correspondingly decreases, but it nevertheless contains so large a proportion of both grease and dirt particles that the accepted fiber is notably cleaner than the product produced by practicing the same process with the stock at ambient temperature.

The effectiveness of the invention in separating grease, wax and similar materials from the papermaking fibers appears to be related to the fact that since many of these materials present in garbage have a softening range higher than ambient temperature they tend to appear as lumps or clumps or sorbed in and/or on the papermaking fiber at ambient temperature. The lumps bind together other contaminants, as well as fibers, and the resulting conglomerates behave like fibers when subjected to centrifugal force.

If the grease, wax or similar material sorbed with the fiber is not removed by the subject process, it interferes with the subsequent cooking, bleaching and in general upgrading of the papermaking fiber including apparently its fiber-fiber bonding ability in subsequent sheet forming operations. If the stock is heated sufficiently to soften the grease, wax and/or similar materials and to disperse fiberbound materials, preferred results having been obtained at temperatures in the order of 180°F, the lumps break up, and since the softened materials have a specific gravity range, in general, lower than that of fiber, and perhaps more importantly surface active properties, they migrate to the center of the centrifugally induced vortex and exit at the top of the cone taking with them other reject material such as grass, small pieces of light film plastic, synthetic fibers, etc. Lower temperatures can be used, e.g. in the range of 120°-150°F, if the grease or wax contaminants in the stock will soften at such lower temperatures, but for optimum results with respect to all light contaminants, the higher temperatures should be used.

A second feature of the invention is that as the temperature of the stock goes up, the viscosity of the liquid (water) decreases. The drag of the liquid on the fibers therefore materially decreases, and they move correspondingly rapidly to the outside of the vortex. The grease, and the small specks and particles of lower specific gravity which had formed part of the greasy conglomerates, are therefore free to remain nearer the center of the vortex, and exit upwardly with the other reject material.

The utility of the invention is therefore not limited to the cleaning of papermaking fibers contaminated with garbage, although it does offer outstanding advantages for that purpose. It is also useful for cleaning other secondary fiber stocks which contain grease and/or wax, typical examples being de-inked stocks, office waste containing carbon paper, and waste paper having substantial quantities of waxed paper, and it has proved to be especially effective in eliminating plastic fibers and fragments similar in size and specific gravity to paper fibers.

BRIEF DESCRIPTION OF THE DRAWING

FIG. 1 shows somewhat schematically a complete system for practicing the invention for cleaning garbage-contaminated fibers.

DESCRIPTION OF PREFERRED EMBODIMENTS

The system shown in FIG. 1 includes a waste treatment pulper tub 10 to which solid waste materials may be fed any suitable means, such as a conveyor 12. A junk remover 13 communicates with tub 10 for removing relatively infrangible materials therefrom, and an aqueous medium, such as water, may be fed into the tub through the junk remover 13 by means of the line 14.

All the above equipment may be of the type more fully described in U.S. Pat. No. 3,549,097, with the pulper preferably being of the characteristics shown in Pat. No. 3,595,488. As described in detail in those patents, a rotor 15 is provided in tub 10 which establishes a vortical flow pattern and subjects the solid waste material in the tub to violent hydraulic and mechanical shear forces, thereby reducing relatively frangible portions of the solids to a predetermined size for extraction through a bed-plate 16 in the bottom of the tub having perforations in the range of ½-inch to 1 ½-inches in diameter.

A slurry, consisting of a portion of the aqueous medium and relatively frangible solid waste materials reduced to a size sufficiently small to pass through the bedplate 16, removed by means of line 18 and pumped by pump 19 to a centrifugal cleaner or liquid cyclone 20 of relatively large size and capacity. This slurry is fed tangentially into cleaner 20, and most of the gritty inorganics are removed through the apex of the cleaner, as indicated by the arrow 22.

The remainder of the slurry, constituting approximately 99 percent of the total volume and about 85 percent of the solids fed into the cleaner 20, passes out of the top of the cleaner by means of the line 24 and is directed to suitable screening apparatus 25, preferably relatively coarse in nature, for example, having screen perforations ⅛-inch in diameter. Reject materials removed from the slurry in the screen 25 are removed through a line 26, and the accepts are directed through line 27 to a relatively fine screen 30 for additional screening, for example through perforations 1/16-inch in diameter.

The accepts from the fine screen 30 are shown as supplied by pump 31 to further cleaning means, represented by a centrifugal cleaner 33 while the rejects from screen 30 pass through a line 34 to the reject disposal line 35, and the rejects from cleaner 33 are similarly directed to line 35 by a line 36. Because in most instances the accepted stock from cleaner 33 will still contain an appreciable quantity of fine particles of organic dirt, it is preferable that it be subjected to a further cleaning operation at this state, which is represented by a pump 39 and centrifugal cleaner 40. Preferably the cleaner 40 will be operated to effect finer cleaning than the cleaner 33, for example by diluting the stock to a consistency of the order of 0.3 percent as compared with 0.7 percent for the cleaner 33, and/or by using a 6-inch cleaner 33 and a 3-inch cleaner 40. The accepted stock from cleaner 40 is delivered by a line 41 to a fines remover 42, shown as an inclined type of screen from which the rejected fines are supplied by a line 43 to the main reject line 35, while the accepted stock goes to a chest 44.

The solids in the accepted stock from fines remover 42 consist of paper fibers contaminated primarily by solvent-soluble greases and waxes, other fiber-like materials, and minute foreign particles. In accordance with the present invention, these contaminants are separated from the paper fibers at the next station in the system, but it is an essential requirement of the invention that the stock be at an elevated temperature when this separation operation is performed, the preferred temperature range for this purpose being approximately 175°-195°F. In order to minimize heat waste, the stock is most readily heated by dilution in the chest 44 with hot water recovered from elsewhere in the system, as described hereinafter, and by directly applying steam to chest 44, as indicated by line 45.

A line 47 and pump 48 deliver the hot accepted stock from the chest 44 to a centrifugal flotation unit 50, which is shown somewhat schematically as of truncated conical configuration, provided with a tangential inlet port 51, an apex outlet port 52 and a base or top outlet port 53. The unit 50 is in effect a centrifugal cleaner of special configuration and mode of operation which result in separation of the incoming slurry into an outer fraction containing the majority of the cellulose fiber material, and an inner fraction containing the majority of the grease and wax. Further, the unit 50 is caused to operate in such manner that the outer fraction is discharged through the apex outlet port 52 to its discharge line 55 as accepted material, while the fraction containing the grease, wax and other low specific gravity contaminants is discharged through the top outlet port 53 to its discharge line 56 as reject.

These operating conditions and results are obtained by so proportioning the several ports and so controlling the feed and pressure that the two fractions discharged through the respective ports 52 and 53 are approximately equal in volume, and the pressure drop should be sufficient to generate centrifugal force conditions at least equivalent to those used for conventional centrifugal cleaning operations. As a specific example, satisfactory results in the practice of the invention have been obtained using, as the unit 50, a vortex cleaner of 3-inch diameter in which the inlet port 51 and top outlet port 53 are each ½-inch in diameter, as is conventional, but in which the apex outlet port 52 is 7/16-inch in diameter, as compared with a conventional size of ⅜-inch in diameter for this port, an inlet pressure of 45 psig, zero back-pressure, and with the stock in the range of 180°-185°F. The unit 50 as a whole may be conical or may have a conventional cylindrical section at its base end, as is conventional.

The values given above in connection with the use of the unit 50 provide typical suitable operating conditions for the practice of the invention, but there is some latitude in these values, and it should also be noted that the consistency of the slurry supplied to the unit 50 is an important factor. In particular, tests indicate that the lower the consistency, the more effective will be the desired separation, and the best results have been obtained at consistencies at the low end of the range of 0.3–0.7 percent. An advantage provided by this factor is that since the accepted stock from the fines remover 42 has a consistency in the range of 2–3 percent, at least some of the necessary dilution in the chest 44 can be done with hot water discharged from unit 50 through the reject outlet line 56. This reject discharge passes first through a heat exchanger 60 and then to a clarifier 61 for removal of its grease and solids content as indicated at 62, and the clarified water from clarifier 61 is carried by the line 63 through the heat exchanger 60 to chest 44.

Another important controlling factor is the ratio of the flow areas of the inlet port 51 to the apex outlet port 52. On a relatively small cleaner such as the 3-inch unit described, this ratio should be at least 1:1 for maximum yield, but need not be substantially greater. Thus the outlet 52 may have a diameter in the range of 7/16-inch to 9/16-inch when the inlet port is ½-inch in diameter. For a larger cleaner, such for example as one which is 6 inches in diameter, this ratio should be in the range of 1:1 to 1:1.5.

In general, it can be stated that a fiber yield of the highest quality is obtained from a centrifugal flotation unit by increasing the pressure drop, reducing the accepted volume, and operating at very low consistencies such as 0.3 percent, but this yield will correspondingly be reduced to the extent that the reject fraction is increased. The most satisfactory results thus far have been obtained with a 3-inch unit as described above, and the above disclosure with respect to the ratio of the inlet port to the apex outlet port can be appropriately restated for a 3-inch unit as a ratio in the range of 1:0.75 to 1:1.25 depending upon the desired volume and quality of yield of accepted fibers.

The accepted material from the unit 50 which exits through the apex outlet 52, will ordinarily need additional treatment or treatments, depending upon the use to which it will ultimately be put. It is accordingly shown as delivered by the line 55 to further treatment stations. The most likely suitable further treatment is digestion, especially if the fiber is to be bleached. The station 65 accordingly represents a digester, and satisfactory results can be obtained with any conventional digester, using NaOH as chemical in concentrations of 1–15 percent by weight based on pulp, pressure and temperature conditions ranging from 10 psi and 239°F to 100 psi and 338°F, and times of 5 – 15 minutes.

The station 66 represents a suitable dewatering device ahead of the digester, which can produce consistencies as high as 45 percent as compared with the 0.6 – 2.0 percent at which the accepted stock leaves the flotation unit 50, and the dewatering station 66 also serves as a source of heated water capable of use for dilution purposes in the chest 44, as indicated by the line 67. Another such source, which will provide even hotter water, is the blow tank represented by the station 70 into which the digester 65 discharges, which has a water supply line 69, and from which a line 71 connects with the line 67. The station 72 represents a final station of washing and dewatering apparatus for the digested stock. It may also be found desirable to subject the accepted stock from unit 50 to a conventional centrifugal cleaning operation before digestion, as indicated by the pump 75 and cleaner 77.

The sequence of steps represented by the several stations in the drawing is preferred, particularly as to locating the digestion station after centrifugal flotation, for practical and economic reasons. If digestion were carried out first, caustic would be used up unnecessarily by the grease, wax and similar materials which could have been removed by centrifugal flotation before digestion, and it would also be necessary to dilute the digested stock for a subsequent step of centrifugal flotation. Subject to such practical considerations, however, the station for practicing centrifugal flotation in accordance with the invention may be located in any of the positions of the centrifugal flotation station shown in the above Marsh et al application Ser. No. 415,301.

While the invention has special utility in systems for recovering papermaking fibers from excessively greasy waste materials, it is not limited to the treatment of garbage-contaminated waste and can be practiced advantageously for the treatment of other wasteparper stocks having sufficient grease or wax contamination to constitute a problem. Typical examples of such other waste paper stocks include de-inked stocks and any stock containing an appreciable amount of carbon paper or of any type of paper or board coated or impregnated with wax. For such uses, the centrifugal flotation step could advantageously follow chemical treatment, for example in a de-inking system, or no chemical treatment may be required at all.

The preliminary treatment of secondary fiber source materials otehr than municipal waste may not require some of the components of the system shown in the drawing, many such treatments and systems being in common use, but in each case, such system will deliver to a mix tank or storage chest an aqueous slurry wherein the solid constituents are of a maximum particle size of the order of paper fibers and consist essentially of paper fibers contaminated with organic materials of the class of grease and wax which are of lower specific gravity than paper fibers, and also with particles of smaller effective diameter than paper fibers, particularly if a fines remover is not ahead of the tank 44. The chest 44 in the drawings is representative of such a mix tank or storage chest, and that part of the system shown in the drawing which begins with the chest 44 is accordingly representative of the application of the invention to the treatment of any type of such contaminated paper stock.

The high temperature range of the order 160–200°F noted above is not only especially effective for the elimination of grease and wax from papermaking fibers, but operation in that range is also notably more effective than at ambient temperature for the removal of noncellulosic fibrous materials, such particularly as synthetic fibers and hair, and even fragments of plastic fiber similar in size and specific gravity to paper fibers. In fact, the efficiency of centrifugal flotation for the elimination of such contaminants has been proved by test to increase in essentially direct relation with the temperature of the stock.

While the process herein described constitutes a preferred embodiment of the invention, it is to be understood that the invention is not limited to this precise process, and that changes may be made therein without departing from the scope of the invention.

What is claimed is:

1. In the recovery of paper fiber for reuse from waste paper material, the process of separating the reusable paper fibers from light organic contaminants of specific gravities similar to or lower than paper fibers, comprising the steps of:
   a. forming from said waste material a pumpable aqueous slurry wherein the solid constituents are of a maximum particle size of the order of paper fibers and consist essentially of paper fibers and one or more of such light organic contaminants, namely, grease, wax and plastic fragments and fibers similar in size and specific gravity to paper fibers,
   b. heating said slurry to an elevated temperature of at least 120°F sufficient to soften whatever grease and wax is present therein,
   c. supplying said heated slurry to a closed cylindrical-conical vessel having a tangentially arranged inlet port adjacent the base thereof and having outlet ports in the apex and base thereof, said inlet and base ports being of substantially the same order of flow area,
   d. maintaining the supply flow to said inlet port sufficiently high to develop in said vessel centrifugal force conditions causing vortical separation of said slurry within said vessel into an outer fraction containing the large majority of the paper fibers and an inner fraction containing the large majority of said light contaminant materials, and to cause discharge flows of said outer and inner fractions through said apex and base ports respectively,
   e. maintaining said discharge flows through both of said outlet ports in predetermined relation such that the portion of said outer fraction discharged through said apex port as accepted stock contains the large majority of the paper fibers which enter said vessel, and
   f. recovering said paper fibers in said accepted stock for resuse.

2. The process as defined in claim 1 wherein said elevated temperature is in a range of the order of 120°–150°F.

3. The process as defined in claim 1 wherein the ratio of the effective flow area of said inlet port to said apex port is in the range of 1:0.75 to 1:1.25.

4. The process as defined in claim 1 wherein all of said ports are of substantially the same effective flow area, and the discharge flows through said outlet ports are substantially equal.

5. The process as defined in claim 1 comprising the further step of subjecting said accepted stock to digestion before recovering said paper fibers for reuse.

6. The process as defined in claim 1 wherein said waste paper material is municipal waste including garbage.

7. The process as defined in claim 1 wherein said slurry comprises de-inked paper stock.

8. The process as defined in claim 1 wherein said pumpable slurry is formed by the successive preliminary step of:
   i. producing a slurry comprising water, paper fibers, garbage, and at least some of the following contaminant materials:
      frangible and infrangible inorganics,
      vegetation residues,
      insoluble inorganics,
      grit and other dirt,
   ii. centrifugally cleaning said slurry to remove the majority of said inorganics therefrom,
   iii. subjecting said cleaned slurry to screening efffective to remove therefrom particles larger than paper fibers,
   iv. centrifugally cleaning said screened slurry to remove high specific gravity particles therefrom,
   v. removing a substantial portion of fine fibers from said screened and cleaned slurry, and
   vi. thereafter carrying out steps (b), (c), (d) and (e) of claim 1.

9. The process as defined in claim 8 comprising the further step of subjecting said accepted stock to digestion before recovering said paper fibers for reuse.

* * * * *